E. T. LIPPERT.
INSERTABLE SAW TEETH.

No. 178,450. Patented June 6, 1876.

Witnesses:
Theo. Mungen.
George H. Howard.

Inventor:
Ernst Theodor Lippert
by W. Burris
Attorney.

UNITED STATES PATENT OFFICE.

E. THEODOR LIPPERT, OF MILLVALE, PENNSYLVANIA.

IMPROVEMENT IN INSERTIBLE SAW-TEETH.

Specification forming part of Letters Patent No. 178,450, dated June 6, 1876; application filed April 29, 1876.

*To all whom it may concern:*

Be it known that I, ERNST THEODOR LIPPERT, of Millvale, in the county of Allegheny and State of Pennsylvania, have invented certain new and useful Improvements in Insertible Saw - Teeth; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1:
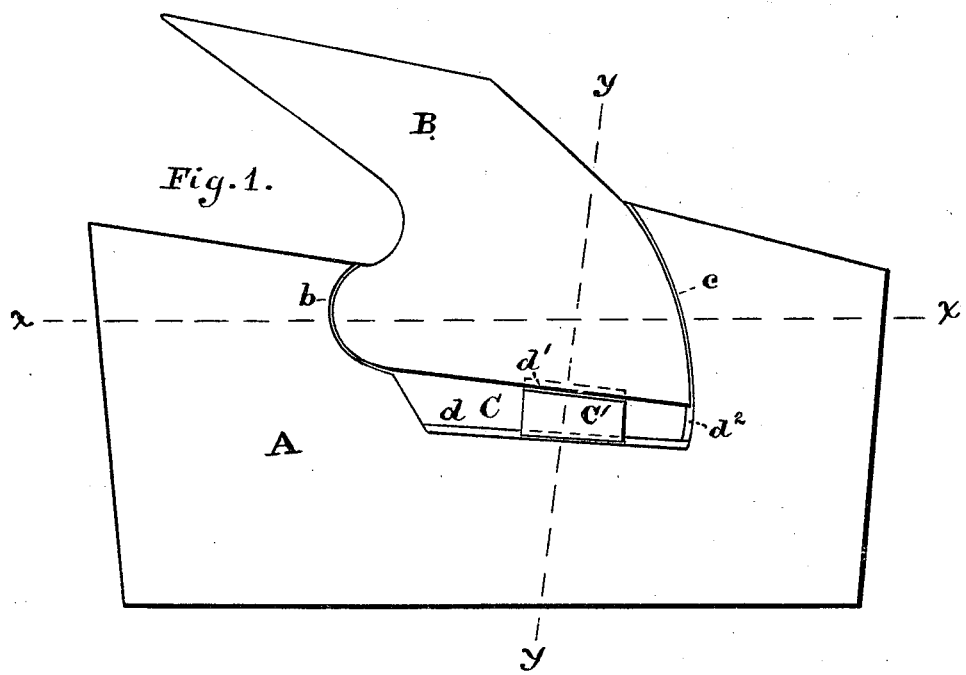
Figure 2:
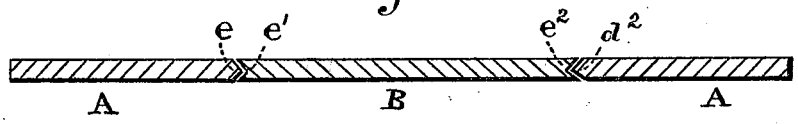
Figure 3:
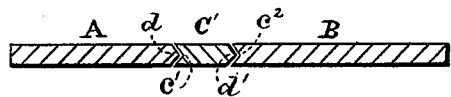

Figure 1 is a side view of a section of the saw with a tooth attached. Fig. 2 is a longitudinal section on line $x\,x$ of Fig. 1. Fig. 3 is a transverse section on line $y\,y$ of Fig. 1.

My invention relates to removable saw-teeth; and consists in the structure of the teeth and plate to receive and hold the teeth, and the method of fastening them in the plate, as hereinafter described.

A represents a section of the saw, and B a detachable tooth, made with curves at $b\,c$, and straight on the inner edges, forming a tapering slot, C, as shown in Fig. 1 of the drawings. C' is a tapering wedge in slot C, provided with angular tongue and groove $c^1\,d^1$, to fit the angular tongue $d$ on the inner edge of the plate, and groove $c^2$ in the inner edge of the tooth, as shown in Figs. 1 and 3 of the drawings. The curved edges of the plate and tooth at $b\,c$ are provided with angular tongues $e\,d^2$ and grooves $e^1\,e^2$, as seen in Fig. 2 of the drawings.

The tooth being adjusted in the plate, the wedge is inserted at the wider end of the slot, and driven tightly toward the other end, pressing the tooth tightly against the edges of the plate at $b\,c$, and holding it firmly in position, as shown in Fig. 1 of the drawings.

To detach the tooth the wedge is loosened and moved backward to the wider end of the slot, allowing the tongue and groove at $c$ to be disengaged, and the tooth to be pressed laterally out of the plate.

I am aware of the patent granted to J. E. Emerson, No. 142,781, September 16, 1873, and hereby disclaim the construction therein shown and described.

What I claim as new, and desire to secure by Letters Patent, is—

The removable tooth B, formed on a tooth-plate having curves at $b\,c$, and straight on the inner edge, in combination with the saw-plate A, having curves at $b\,c$ to fit the curves on the tooth-plate, and tapering wedge C', provided with tongues and grooves, substantially as and for the purposes described.

In testimony that I claim the foregoing as my own I affix my signature in presence of two witnesses.

E. THEODOR LIPPERT.

Witnesses:
W. C. BERINGER,
ADAM G. MILBY.